United States Patent [19]

Klepsch et al.

[11] Patent Number: 4,695,239
[45] Date of Patent: Sep. 22, 1987

[54] THERMOPLASTIC SHEET FORMING DEVICE

[75] Inventors: Wilhelm Klepsch; Dietmar Plöbst, both of Kaprun, Austria

[73] Assignee: Senoplast Klepsch & Co., Austria

[21] Appl. No.: 833,897

[22] Filed: Feb. 26, 1986

[30] Foreign Application Priority Data

Nov. 14, 1985 [AT] Austria ................... 3316/85

[51] Int. Cl.$^4$ .............................................. B29C 43/46
[52] U.S. Cl. ..................................... 425/194; 264/175; 425/327; 425/342.1; 425/367; 425/DIG. 235
[58] Field of Search .............. 425/194, 325, 335, 337, 425/340, 343, 342.1, 363, 367, 394, DIG. 235, 327, 185; 72/206, 252, 250; 264/175

[56] References Cited

U.S. PATENT DOCUMENTS

| | | | |
|---|---|---|---|
| 626,847 | 6/1899 | Theobald | 425/DIG. 235 |
| 1,519,569 | 12/1924 | Vicars | 425/367 |
| 1,552,559 | 9/1925 | Hammond et al. | 425/367 X |
| 2,159,044 | 5/1939 | Paterson | 425/DIG. 235 |
| 2,175,337 | 10/1939 | Boice | 425/DIG. 235 |
| 2,651,076 | 9/1953 | Hornbostel | 425/194 |
| 3,024,404 | 3/1962 | Ziffer | 425/367 X |
| 3,501,561 | 3/1970 | Oxley et al. | 425/DIG. 235 |
| 4,056,592 | 11/1977 | Izumi et al. | 425/325 X |
| 4,519,757 | 5/1985 | Wittkopf et al. | 425/194 X |

FOREIGN PATENT DOCUMENTS 2439797  3/1976  Fed. Rep. of Germany ... 425/DIG. 235

Primary Examiner—Richard L. Chiesa
Attorney, Agent, or Firm—McGlew and Tuttle

[57] ABSTRACT

A device to produce material webs of thermoplastic plastics, independently of the thickness at least between 100 μm and 12 mm includes a single apparatus comprising cooled calender rolls mounted on a respective bottom frame and a top frame. The top frame is adjustable relative to the bottom frame between two operating positions. Of a feed roll pair, preferably directly following a sheet die, one of two feed rolls is arranged in the bottom frame and the other in the top frame. Thereby, in one operating position, the upper feed roll, and in the other operating position a smoothing ledge is associated with the feed roll of the bottom frame. The smoothing ledge is provided at the top frame and preferably has an air outlet nozzle. The top frame is preferably arranged with a slide which is displaceable in a slideway of the bottom frame.

20 Claims, 3 Drawing Figures

4,695,239

THERMOPLASTIC SHEET FORMING DEVICE

FIELD AND BACKGROUND OF THE INVENTION

This invention relates in general to plastic forming devices and in particular to a new and useful device for extruding and forming plastic sheets which includes one or more calender rolls over which a sheet is extruded arranged in connection with calender rolls and a smoothing ledge which may be adjustably positioned for forming webs of varying thickness.

The invention relates particularly to an apparatus for processing thermoplastic plastics to material webs, in particular barrier foils for food packaging, with the use of preferably cooled calender rolls, the distance between axles of a pair of feed rolls being adjustable. With such an apparatus, the thermoplastic substance, coming in particular from a sheet die, is rolled to material webs preferably with cooling. The number and arrangement of additional calender rolls depends on product-related criteria which determine, of course, also the feed roll nip, among other things.

A special problem in this connection is that the thickness range of the material webs that can be produced cannot be less than about 600 $\mu$m as a lower limit, particularly when the calender rolls are to process webs of up to 12 mm and more. It is a generally known problem to produce especially thin foils in uniform thickness and for this purpose special devices have been developed.

SUMMARY OF THE INVENTION

The invention provides an apparatus by means of which material webs can be produced at least in a thickness range of from 100 $\mu$m to 12 mm.

According to the invention, one of the two feed rolls is disposed in a bottom frame and the other in a top frame which is adjustable relative to the bottom frame and comprises a smoothing ledge, where in the two operating positions either the upper feed roll or the smoothing ledge is associated with the feed roll of the bottom frame.

By the selective combination of the feed roll of the bottom frame with the feed roll of the top frame or with the smoothing ledge it is possible, to produce material webs at least of a thickness range of around 100 $\mu$m to 12 mm.

The fabrication of the material webs occurs with a thickness of about 600 $\mu$m to 12 mm in the usual manner by the use of the pair of feed rolls, while the especially thin material webs between 100 $\mu$m and 600 $\mu$m can be produced by the correlation of the smoothing ledge to the feed rolls of the bottom frame. The respective contact pressure part of the top frame not used is then in an inactive position.

In a first realization it is provided that the top frame has a slide which is displaceable in a slideway of the bottom frame. Thereby an especially simple adjustment between the two operating positions is achieved. This retooling is greatly facilitated if the slideway is pivotable on the bottom frame about an axis parallel to its feed roll.

In a further realization it is provided that in the top frame a second calender roll is mounted pivotable about a parallel axis.

Consequently the operating position in which the feed roll pair is employed is suitable for leading the material web through the rolls of the top frame approximately in the entire thickness range between 600 $\mu$m and 12 mm.

Another realization, which permits direct connection of the apparatus to the extrusion die, provides that the smoothing ledge is suspended pivotable on a pendulum frame. Thereby the smoothing ledge can be removed from the material web level in the operating position of the feed roll pair in which the ledge is to be displaced in the direction of the extrusion die.

Preferably the smoothing ledge is provided with an air outlet nozzle, and can be arranged for adjustment in height on the pendulum frame, owing to which, in adaptation to the material web thickness, an application against the feed roll of the bottom frame occurs exclusively by the air ejected from a blower through the nozzle, so that the contact pressure is especially easy to adjust and can be chosen much lower than in the case of a roll pair. The air issuing from the nozzle also serves to cool the material web.

Following the feed roll, preferably several calender rolls are provided in the bottom frame, so that also in the operating position of the feed roll pair another option exists, in that the material web is guided either through the rolls of the top frame or through the rolls of the bottom frame. In both roll sets, each roll can be driven singly by means of a thyristor controlled dc gear motor. For this, two drive possibilities may be provided: In synchronous running, a drive velocity given by the master drive (feed roll of the bottom frame) is transmitted synchronously to the follow-on drives change in the same amount. In a single run, as in synchronous run, a drive velocity is preset. In addition, the drive velocity of each chromium-plated roll can be varied singly through a potentiometer to compensate material shrinkages. In each of the two regulatory states, individual rolls can be connected and disconnected.

Accordingly it is an object of the invention to provide an improved apparatus for processing thermoplastic material to material webs and which comprises a bottom frame arranged below a top frame which may be adjusted in their relative positions and which includes a bottom feed roll mounted in the bottom frame and top feed roll mounted in the top frame and a smoothing ledge also carried by the top frame and wherein the bottom and top frames are shiftable relative to each other so that a selected one of the upper feed rolls and the smoothing ledge is arranged in an opposite position in respect to the lower feed roll.

A further object of the invention is to provide a plastic sheet forming device which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
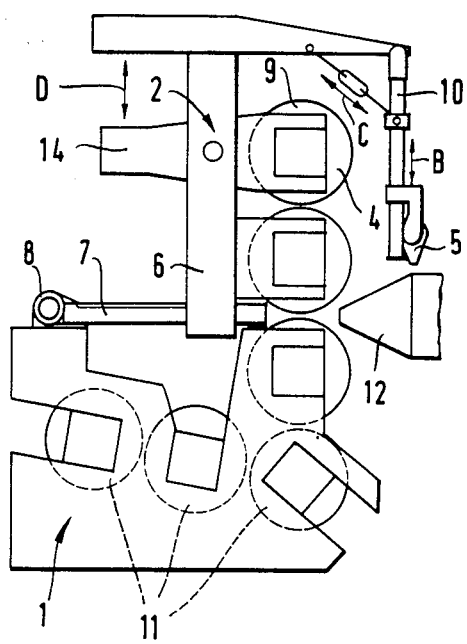
FIG. 1 is a schematic side elevational view of an apparatus for forming plastic sheets constructed in accordance with the invention.

Referring to the drawings in particular, the invention embodied therein comprises an apparatus for processing thermoplastic plastic material into plastic webs which comprises a bottom frame 1 and a top frame 2 having means adjustably positioning them relative to each other. In the embodiment shown, means for the relative positioning of the top frame relative to the bottom frame 1 includes a slideway 7 which is pivotally mounted on an axle 8 on the bottom frame 1. The top frame 2 carries a slide 6 which engages in the slideway 7 so that the frame may be moved backwardly and forwardly. In accordance with a feature of the invention the bottom frame 1 carries a feed roll 3 which may selectively cooperate with a feed roll 4 to form webs of selected width of plastic material which is extruded from a sheet die 12. Alternatively, the feed roll 3 may cooperate with a smoothing instrument or ledge 5 carried on a pendulum frame 10 of the upper frame 2.

An apparatus according to the invention comprises a bottom frame 1 and a top frame 2, the bearing area of which is designed as a slide 6. On the top side of the bottom frame 1 a slideway 7 is provided, which is raisable about an axle 8.

On the bottom frame 1, a feed roll 3 and following it several cooled calender rolls 11 is provided. Associated with the feed roll 3, also in the top frame 2 a feed roll 4 is disposed, which is followed by another calender roll 9. Articulated to the top frame 2 in a feed direction is a pendulum frame 10 which carries at the lower end a smoothing ledge 5. The smoothing ledge 5 as well as the pendulum frame 10 are movable in the direction of the double arrows B,C shown in FIG. 1, by means of suitable adjusting means. The calender roll 9 of the top frame 2 is mounted in arms 14 which are pivotable in the direction of the double arrow D.

Figure 3:
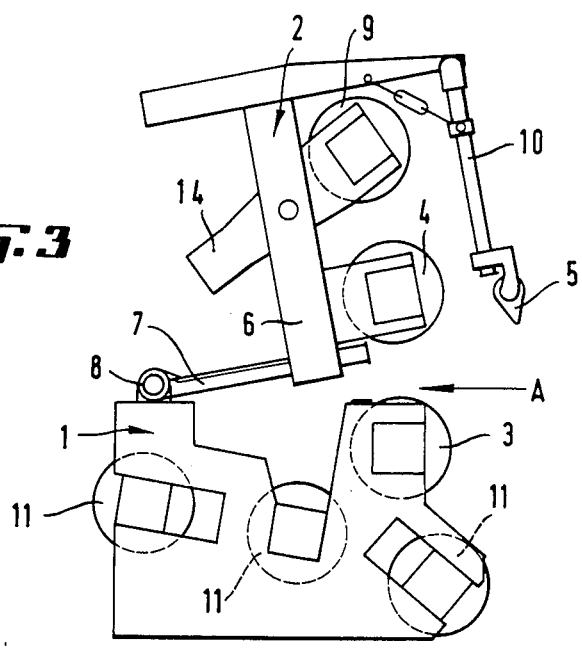
FIG. 3 is a view similar to FIG. 1 indicating the adjustability of the parts relative to each other.

In the operating position shown in FIG. 1 for the production of material webs of a thickness between 600 μm and at least 12 mm, a sheet die 12 of the extruder is arranged in the near zone. The top frame 1 is shifted on the slideway 7 into what in the drawing is its right-hand end position, in which the axes of the rolls 9 and 4 of the top frame and of the feed roll 3 of the bottom frame 1 lie in one plane. The smoothing ledge 5 disposed on the pendulum frame 10 is then raised to an upper position, so that it finds space in an inactive position above the sheet die 12. The apparatus, corresponding in this operating position to a calender rolling unit, then still leaves open the option to guide the material web over the two rolls of the top frame 2 or over the individual connectable rolls of the bottom frame 1. As can be seen from FIG. 3, individual calender rolls 11 are adjustably mounted in the bottom frame 1, as is also the calender roll 9 of the top frame 2, which is arranged on the arms 14.

Figure 2:
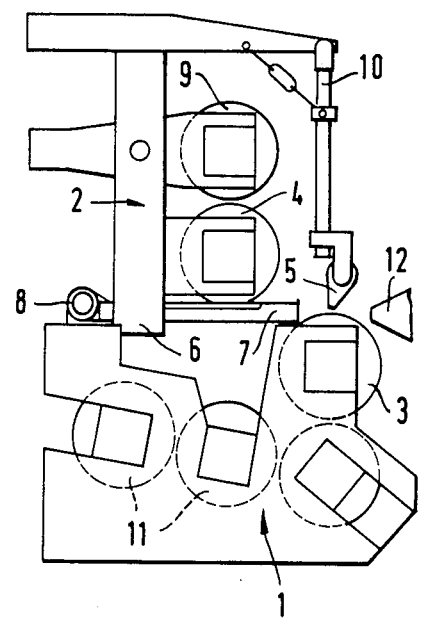
FIG. 2 is a view similar to FIG. 1, the parts in a second operating position with the smoothing ledge being operational.

For the production of very thin material webs, for instance in a thickness between 100 μm and 600 μm, use of the apparatus as calender rolling unit according to FIG. 1 is not possible. For this, the apparatus is brought into the position shown in FIG. 2, the entire top frame 2 being shifted to the left on the slideway 7. Subsequently the smoothing ledge 5 is lowered, and the pendulum frame 10 as well as the smoothing ledge 5 itself are pivoted into the required angular position. As the smoothing ledge 5 is preferably given an air outlet to which air is supplied from a blower, the pressing on and smoothing, occurring by the air, of the material web issuing from the adjacent sheet die 12 (arrow A) can be regulated very precisely. At the same time the issuing air also cools the material, so that the subsequent looping at least of the feed roll 3 of the bottom frame 1 causes no disturbances or difficulties.

The invention is of special importance for the manufacture of barrier foils. Such foils comprises several layers of thermoplastic plastic, the cover layers of which may consist for example of polystyrene (PS), polyethylene (PE), polypropylene (PP) and ethylvinyl alcohol (EVOH). One layer of the foil serves to form a barrier. Thus for example PE prevents the escape of water vapor and hence the drying out of the contents for instance of yogurt cups. EVOH forms a barrier for oxygen, which thus cannot penetrate to the packaged product and alter it chemically. The thickness and composition of barrier foils vary greatly depending on the purpose of use, the employment of calenders being desirable in the manufacture for quality reasons, provided the thickness of the foils permits this at all. Especially in the manufacture of barrier foils, therefore, use will be made of the possibility created by the invention of employing calenders, without much retooling, whenever this is possible, and employing the smoothing ledge exclusively when the minimum thickness of the foils required for this is fallen short of.

While specific embodiments of the invention have been shown and described in detail to illustrate the application of the principles of the invention, it will be understood that the invention may be embodied otherwise without departing from such principles.

What is claimed is:

1. An apparatus for processing thermoplastic material to material webs, comprising a bottom frame, a top frame associated with said bottom frame, means adjustably positioning said top and bottom frames in a selected relative orientation, a bottom feed roll mounted in said bottom frame, a top feed roll mounted in said top frame, a smoothing ledge device carried by said top frame in a position offset from said top feed roll, said bottom and top frames being shiftable relatively between selective operative positions and which one of said upper feed roll and said smoothing ledge is in an operative position with respect to said lower feed roll.

2. An apparatus according to claim 1, wherein said means adjustably positioning said top and bottom frames includes slideway carried by said bottom frame and a slide carried by said top frame which is engageable on and displaceable along said slideway.

3. An apparatus according to claim 2, including means pivotally mounting said slideway on said bottom frame.

4. An apparatus according to claim 1, including a calender roll carried by said top frame, means mounting said calender roll for pivotal movement about said frame.

5. An apparatus according to claim 1, including a pendulum frame member pivotally supported on said top frame and carrying said smoothing ledge.

6. An apparatus according to claim 5 wherein said smoothing ledge includes an air discharge nozzle.

7. An apparatus according to 5, including means for adjusting the height of said pendulum frame.

8. An apparatus according to claim 1, including a plurality of rollers mounted on said bottom frame in driving engagement with said feed roller.

9. An apparatus for processing material to material webs, comprising:
   a bottom frame;
   a bottom feed roll mounted in said bottom frame;
   a top frame associated with said bottom frame;
   a top feed roll mounted in said top frame;
   a smoothing ledge device carried by said top frame in a position offset from said top feed roll;
   means for selectively positioning said top frame and for positioning one of said top feed roll and said smoothing ledge in an operative position with respect to said lower feed roll.

10. An apparatus according to claim 9, further comprising: calender rolls, mounted in said bottom frame.

11. An apparatus according to claim 10, wherein: said calender rolls are cooled.

12. An apparatus according to claim 9, wherein: said means for selectively positioning said top frame and for positioning one fo said top feed roll and said smoothing ledge includes a slideway carried by said bottom frame and a slide carried by said top frame which is engageable on and displacable along said slideway.

13. An apparatus according to claim 12, further comprising: means pivotally mounting said slideway on said bottom frame.

14. An apparatus according to claim 10, further comprising: a calender roll carried by said top frame; and, means for mounting said calender roll for pivotal movement about said frame.

15. An apparatus according to claim 9, further comprising: a pendulum frame member pivotally supported on said top frame and carrying said smoothing ledge; and, means for adjusting the position of said smoothing ledge relative to said pivotally supported pendulum frame.

16. An apparatus according to claim 15, wherein: said smoothing ledge includes an air discharge nozzle.

17. An apparatus for processing material to material webs, comprising: a bottom frame; a bottom feed roll mounted in said bottom frame; a plurality of calender rolls mounted on said bottom frame, in driving engagement with said feed roll;
   a top frame associated with said bottom frame;
   a top feed roll, mounted in said top frame;
   a smoothing ledge device carried by said top frame in a position offset from said top feed roll;
   a pendulum frame member pivotally supported on said top frame and carrying said smoothing ledge;
   means for adjusting the position of said smoothing ledge with respect to said pivotally supported pendulum frame;
   means for selectively positioning said top frame and for positioning one of said top feed roll and said smoothing ledge in an operative position with respect to said lower feed roll, said means for positioning said top frame including a slideway carried by said bottom frame and a slide carried by said top frame which is engageable on and displaceable along said slideway.

18. An apparatus according to claim 17, further comprising: means pivotally mounting said slideway on said bottom frame.

19. An apparatus according to claim 18, wherein: said smoothing ledge includes an air discharge nozzle.

20. An apparatus according to claim 17, wherein: said plurality of calender rolls mounted on said bottom frame are cooled.

* * * * *